(12) United States Patent
Quach

(10) Patent No.: US 8,335,013 B2
(45) Date of Patent: *Dec. 18, 2012

(54) SYSTEM AND METHOD FOR COLOR PRINTER CALIBRATION EMPLOYING MEASUREMENT SUCCESS FEEDBACK

(75) Inventor: Tony T. Quach, Anaheim, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 679 days.

This patent is subject to a terminal disclaimer.

(21) Appl. No.: 12/387,517

(22) Filed: May 4, 2009

(65) Prior Publication Data

US 2010/0277751 A1 Nov. 4, 2010

(51) Int. Cl.
*H04N 1/60* (2006.01)

(52) U.S. Cl. .......... 358/1.9; 358/406; 358/504

(58) Field of Classification Search .......... 358/1.9, 358/406, 504; 347/19; 345/156, 157, 589, 345/600, 601
See application file for complete search history.

(56) References Cited

U.S. PATENT DOCUMENTS

| | | | | |
|---|---|---|---|---|
| 6,109,722 A * | 8/2000 | Underwood et al. | ........... | 347/19 |
| 6,215,562 B1 * | 4/2001 | Michel et al. | ........... | 358/1.9 |
| 7,760,397 B2 * | 7/2010 | Hosier | ........... | 358/1.9 |
| 7,889,403 B2 * | 2/2011 | Kuhn et al. | ........... | 358/504 |
| 2005/0243119 A1 * | 11/2005 | Kuhn et al. | ........... | 347/19 |
| 2006/0232771 A1 * | 10/2006 | VanDuyn et al. | ........... | 356/243.5 |
| 2007/0058859 A1 * | 3/2007 | Baker et al. | ........... | 382/167 |
| 2007/0146742 A1 * | 6/2007 | Klassen | ........... | 358/1.9 |
| 2007/0153340 A1 * | 7/2007 | Itagaki et al. | ........... | 358/504 |
| 2007/0182996 A1 * | 8/2007 | Nakajima | ........... | 358/3.13 |
| 2007/0223064 A1 * | 9/2007 | Ichitani | ........... | 358/504 |
| 2008/0225309 A1 * | 9/2008 | Hosier | ........... | 358/1.9 |
| 2008/0239344 A1 * | 10/2008 | Wang et al. | ........... | 358/1.9 |
| 2009/0059322 A1 * | 3/2009 | Vanduyn et al. | ........... | 358/504 |
| 2009/0091771 A1 * | 4/2009 | Kuhn et al. | ........... | 358/1.9 |
| 2010/0201998 A1 * | 8/2010 | Quach | ........... | 358/1.9 |
| 2010/0231728 A1 * | 9/2010 | Holub | ........... | 348/207.2 |
| 2011/0063640 A1 * | 3/2011 | Tanaka | ........... | 358/1.9 |
| 2011/0116118 A1 * | 5/2011 | Nakase | ........... | 358/1.13 |

* cited by examiner

*Primary Examiner* — Kimberly A Williams
(74) *Attorney, Agent, or Firm* — SoCal IP Law Group LLP; Steven C. Sereboff; Jonathan Pearce

(57) ABSTRACT

The subject application is directed to a system and method for color printer calibration employing measurement success feedback. Color input data is received corresponding to a color printout from an associated color measurement device, the color input data including M×N discrete color areas corresponding to M rows and N columns on the printout, with M and N representing integers greater than 2. A display including a color image comprised of each of the areas arranged in M rows and N columns is then generated on a display device. Color input data is tested to determine successful measurement of colors corresponding to the color areas and a row-based indicator is generated for a successful measurement of color areas within a row. Calibration data is received of a comparison of the color printout to the display and an associated color printer is calibrated based upon the calibration data.

15 Claims, 13 Drawing Sheets
(4 of 13 Drawing Sheet(s) Filed in Color)

US 8,335,013 B2

SYSTEM AND METHOD FOR COLOR PRINTER CALIBRATION EMPLOYING MEASUREMENT SUCCESS FEEDBACK

BACKGROUND OF THE INVENTION

The subject application is directed generally to calibration of color printers. The application is particularly applicable to calibration of color printers in accordance with a generated display output having an arrangement of color areas that correspond to that of a printout from which color measurements where taken.

Early printers were generally relegated to black and white output given the expense and complexity of generating color printouts. More recently, color printers, including inkjet printers, laser printers, and dye-based printers, have been more widely adopted as prices decreased and quality improved.

Physical characteristics of color printing devices, including device characteristics, media properties, or ink or toner characteristics, can significantly affect a quality of an output image. Output characteristics can vary between devices or in accordance with various consumables. Characteristics also vary over the life of a printing device. Accordingly, it is desirable to have a mechanism by which a printing device can be calibrated to as to accurately render color outputs.

Accurate printer calibration requires analysis of multiple colors, shades or tones, all of which must be accurately obtained by a feedback mechanism derived from an input of an actual printer output. Given the number of such outputs, it is difficult to verify that all required input was accurately received.

SUMMARY OF THE INVENTION

In accordance with one embodiment of the subject application, there is provided a system and method for color printer calibration employing measurement success feedback. Color input data is received corresponding to a color printout from an associated color measurement device, the color input data including M×N discrete color areas corresponding to M rows and N columns on an associated printout, wherein M and N are integers greater than 2 and a display is generated on an associated display device, the display including a color image comprised of each of the color areas arranged in M rows and N columns. Color input data is tested to determine successful measurement of colors corresponding to the color areas and a row-based indicator is generated corresponding to a successful measurement of color areas within a corresponding row. Calibration data is received corresponding to a comparison of the color printout to the display and an associated color printer is calibrated in accordance with received calibration data.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The subject application is described with reference to certain figures, including.

DETAILED DESCRIPTION OF THE PREFERRED EMBODIMENT

The subject application is directed to a system and method for calibrating color printers. In particular, the subject application is directed to a system and method for color printer calibration employing measurement success feedback. It will become apparent to those skilled in the art that the system and method described herein are suitably adapted to a plurality of varying electronic fields employing device calibration feedback, including, for example and without limitation, communications, general computing, data processing, document processing, financial transactions, vending of products or services, or the like. The preferred embodiment, as depicted in FIG. 1, illustrates a document processing field for example purposes only and is not a limitation of the subject application solely to such a field.

Figure 1:
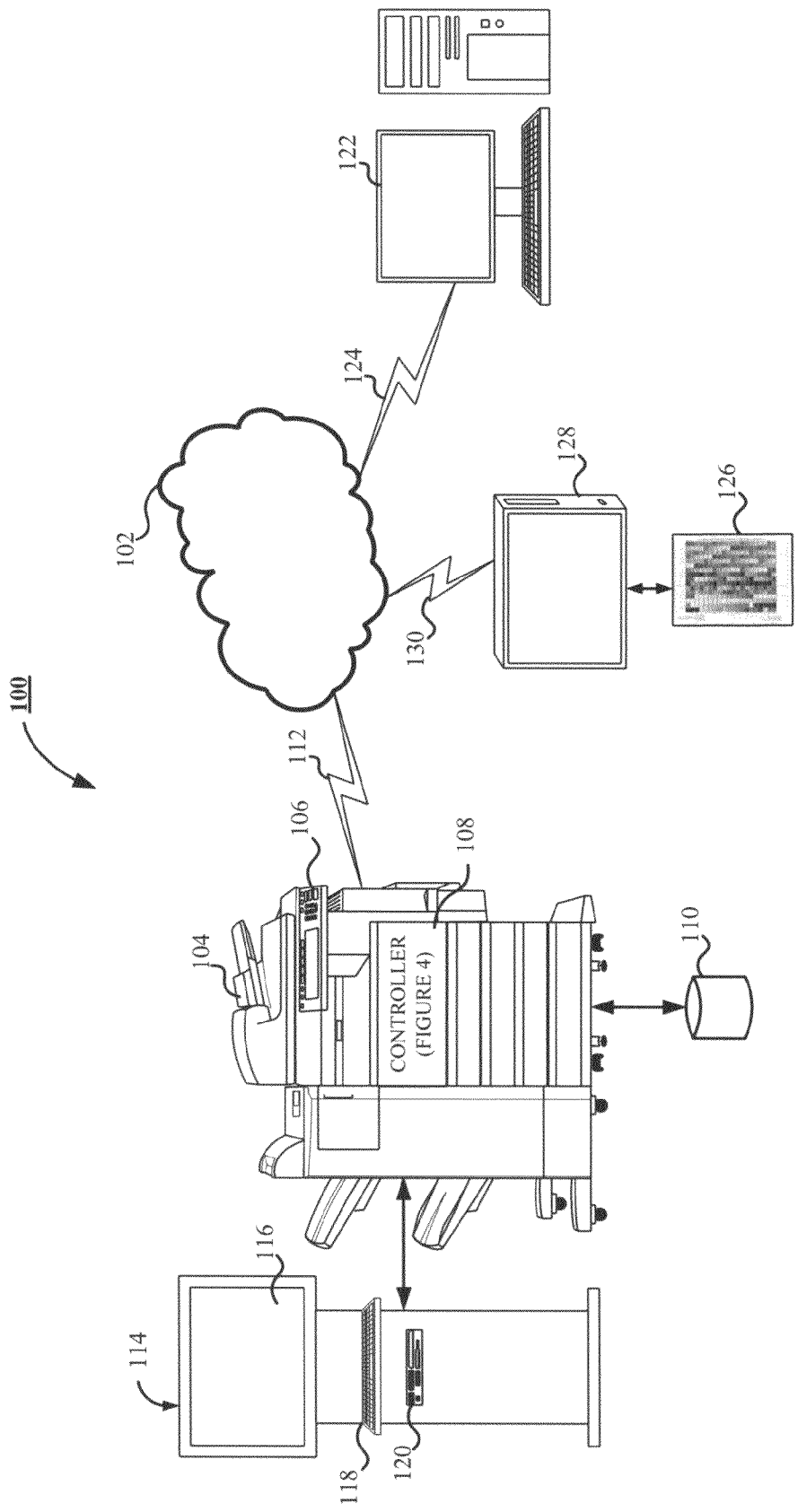
FIG. 1 is an overall diagram of a system for color printer calibration employing measurement success feedback according to one embodiment of the subject application.

Referring now to FIG. 1, there is shown an overall diagram of an example system 100 for implementation of color printer calibration employing measurement success feedback in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like. According to one particular embodiment of the subject application, the document processing device 104 includes an audio reproduction component (not shown) such as a speaker, or the like, capable of emitting tones, sounds, warnings, and the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for color printer calibration employing measurement success feedback. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, color measurement data, color calibration data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like.

FIG. 1 also illustrates a kiosk 114 communicatively coupled to the document processing device 104, and in effect, the computer network 102. It will be appreciated by those skilled in the art that the kiosk 114 is capable of being implemented as a separate component of the document processing device 104, or as an integral component thereof. Use of the kiosk 114 in FIG. 1 is for example purposes only, and the skilled artisan will appreciate that the subject application is capable of implementation without the use of the kiosk 114. In accordance with one embodiment of the subject application, the kiosk 114 includes an associated display 116, and a user input device 118. As will be understood by those skilled in the art the kiosk 114 is capable of implementing a combination user input device/display, such as a touchscreen interface. According to one embodiment of the subject application, the kiosk 114 is suitably adapted to display prompts to an associated user, receive document processing instructions from the associated user, receive payment data, receive selection data from the associated user, and the like. Preferably, the kiosk 114 includes a magnetic card reader, conventional bar code reader, or the like, suitably adapted to receive and read payment data from a credit card, coupon, debit card, or the like.

The system 100 of FIG. 1 also includes a portable storage device reader 120, coupled to the kiosk 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

Depicted in FIG. 1 is a user device 122, illustrated as a computer workstation in data communication with the computer network 102 via a communications link 124. It will be appreciated by those skilled in the art that the user device 122 is shown in FIG. 1 as a computer workstation for illustration purposes only. As will be understood by those skilled in the art, the user device 122 is representative of any personal computing device known in the art including, for example and without limitation, a laptop computer, a workstation computer, a personal data assistant, a web-enabled cellular telephone, a smart phone, a proprietary network device, or other web-enabled electronic device. The communications link 124 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. In accordance with one embodiment of the subject application, the user device 122 is suitably configured to facilitate the receipt and storage of color calibration data, facilitate the generation of displays associated with such color information, communicate color calibration and measurement data from an associated color measurement device 128 (discussed below), an associated document processing device 104, and the like. According to one particular embodiment of the subject application, the user device 122 includes an audio reproduction component (not shown) such as a speaker, or the like, capable of emitting tones, sounds, warnings, and the like. The functioning of the user device 122 will better be understood in conjunction with the diagram illustrated in FIG. 6, explained in greater detail below.

Shown in FIG. 1 is a printout 126 comprising a color array for use in the system and method for color printer calibration employing measurement success feedback in accordance with one embodiment of the subject application. In accordance with one embodiment of the subject application, the printout 126 is representative of a printed target, which includes multiple columns and rows of color patches. According to such an embodiment, the color patches that comprise the printout 126 are drawn with 20 to 30 pixels in width and 20 to 30 pixels in height, with a white space between color patches of 1 to 2 pixels. Preferably, each row and column in the printout is suitably labeled. In the subject application, such a targeted printout 126 is advantageously used to facilitate the calibration of color output devices, such as the document processing device 104. The images comprising the printout 126 of FIG. 1 will be better understood in conjunction with the example color printout of FIG. 11, as well as the screen illustrations of FIGS. 12 and 13, discussed in greater detail below.

FIG. 1 further depicts a color measurement device 128 in data communication with the computer network 102 via a suitable communications link 130. It will be appreciated by those skilled in the art that such a color measurement device 128 is suitably configured to receive and scan the targeted printout 126 in order to generate suitable color calibration data for use in calibrating the output of an associated display, an associated document output device, or the like. As will be understood by those skilled in the art, any suitable densitometer, calorimeter, spectrophotometer, or the like is capable of functioning as the color measurement device 128 in accordance with the subject application. Preferably, any color calibration data generated by the device 128 is capable of being communicated to the document processing device 104, the user device 122, or other device for color calibration, as will be appreciated by those skilled in the art. It will be understood by those skilled in the art that such a color measurement device 128 is further capable of including software, hardware, or a suitable combination thereof, configured to collect and prepare measured color calibration data for use in the subject system and method for display matched color printer calibration.

Figure 2:
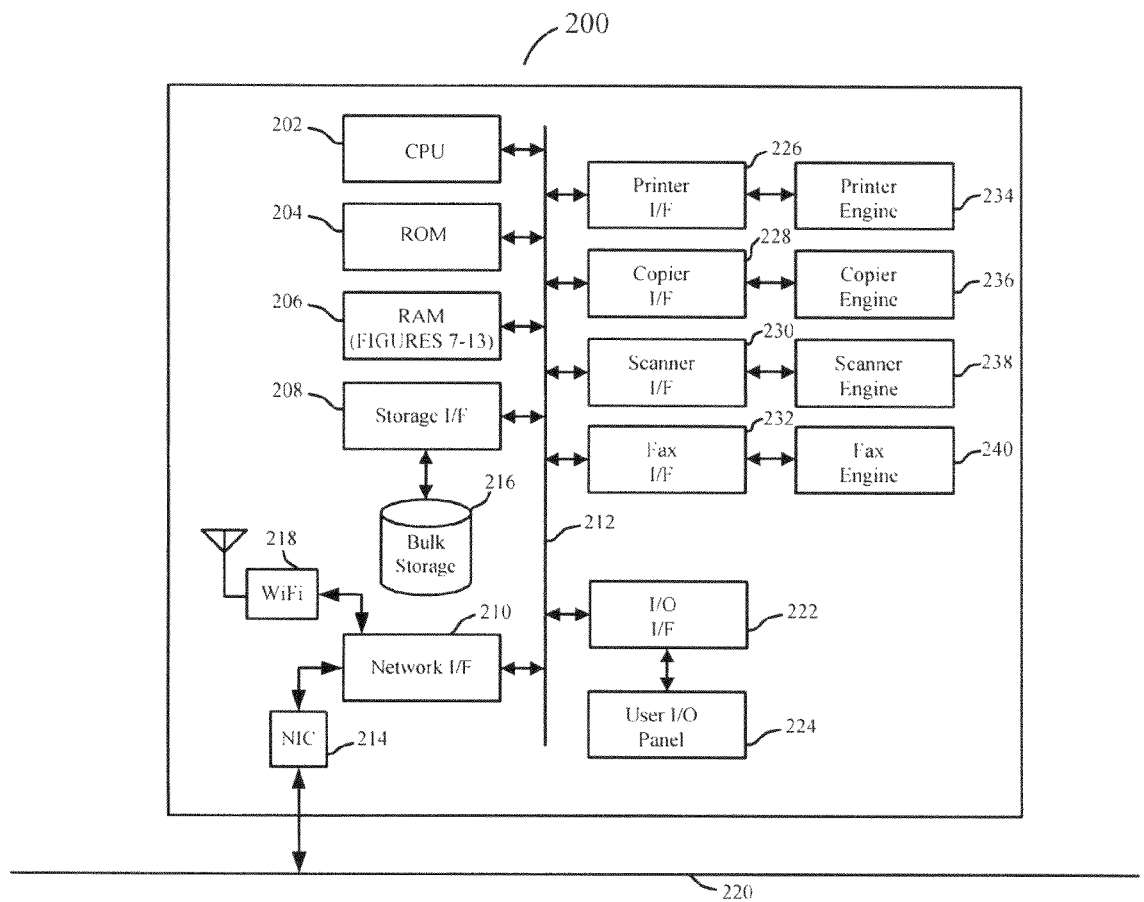
FIG. 2 is a block diagram illustrating device hardware for use in the system for color printer calibration employing measurement success feedback according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
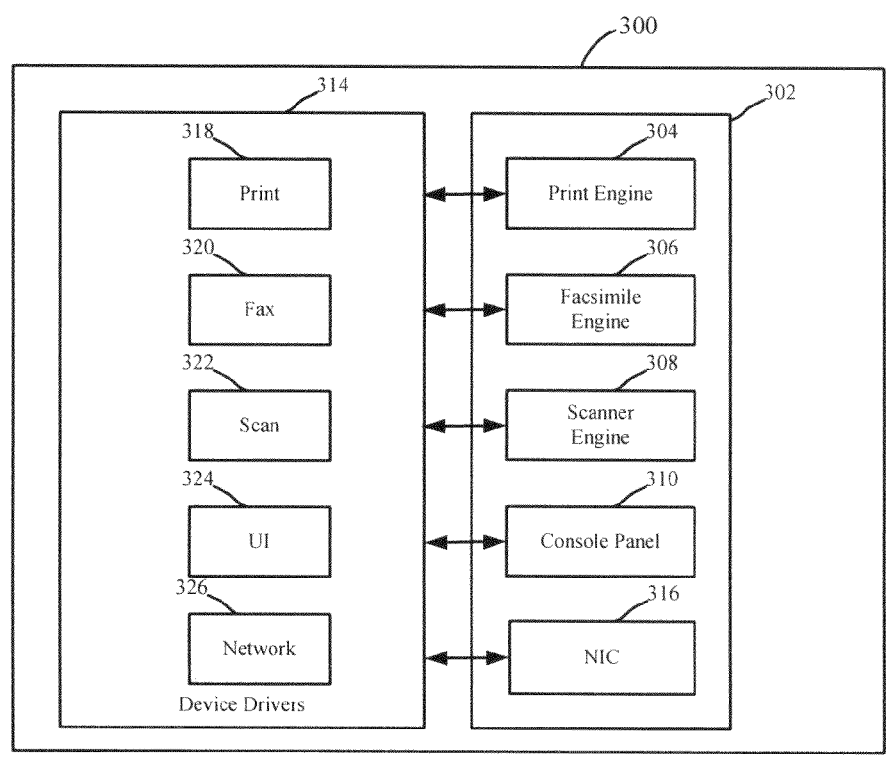
FIG. 3 is a functional diagram illustrating the device for use in the system for color printer calibration employing measurement success feedback according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
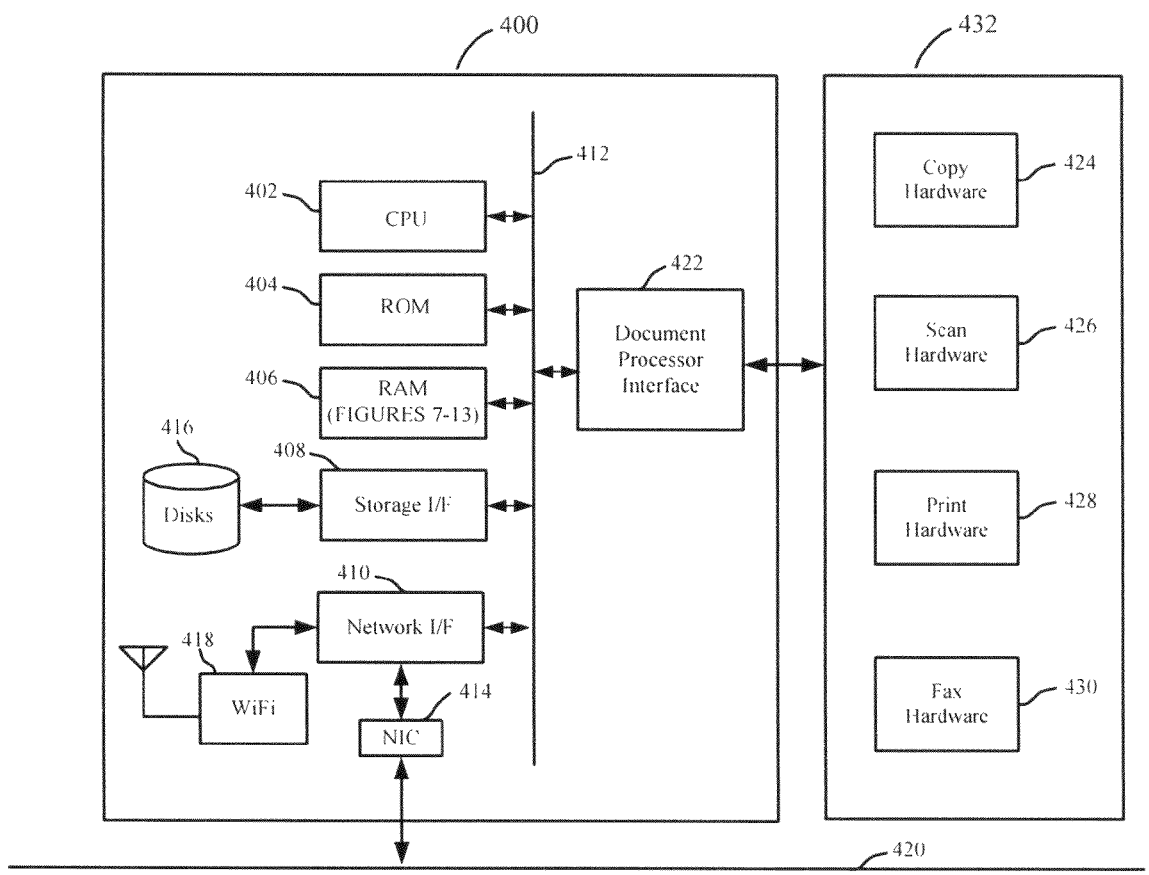
FIG. 4 is a block diagram illustrating controller hardware for use in the system for color printer calibration employing measurement success feedback according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
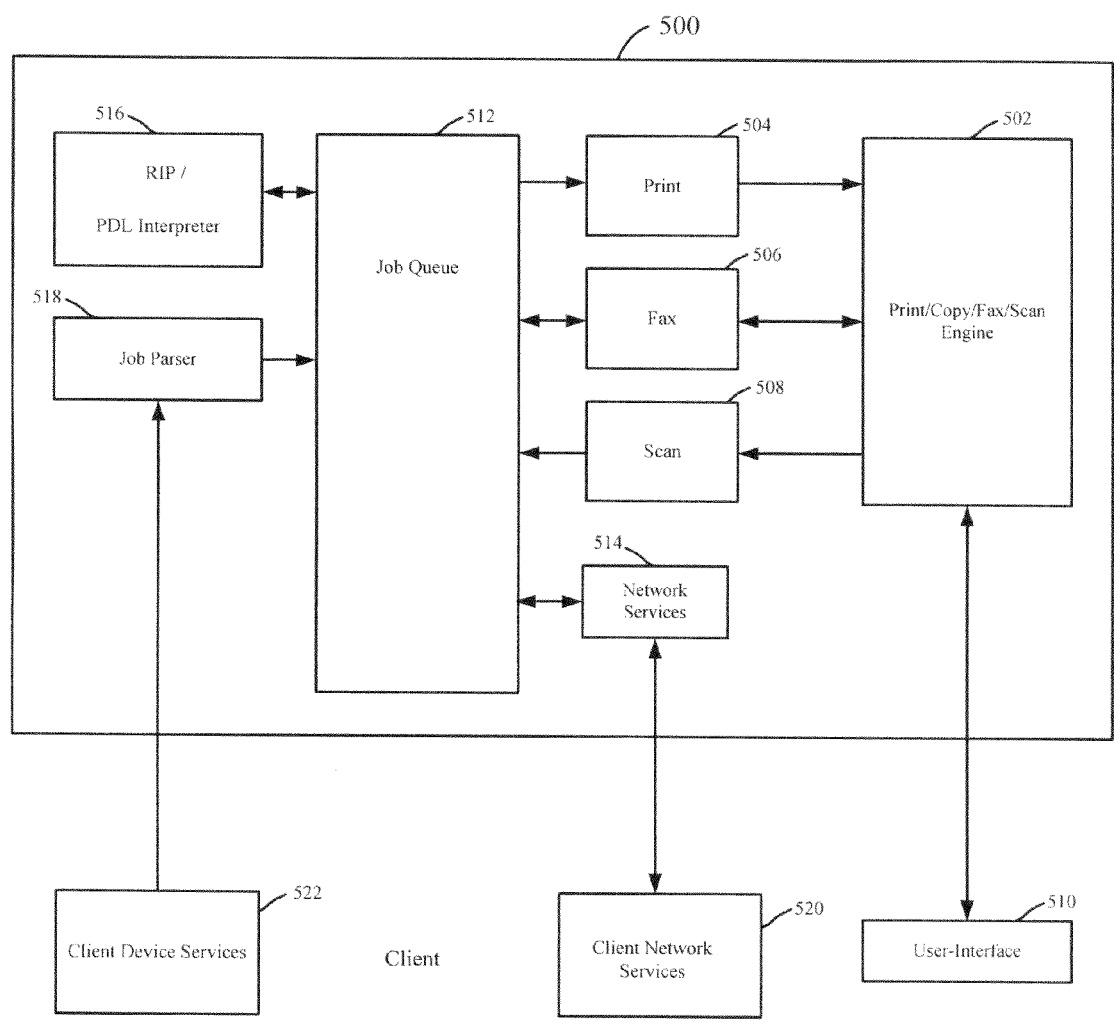
FIG. 5 is a functional diagram illustrating the controller for use in the system for color printer calibration employing measurement success feedback according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment includes a document processing engine 502. Suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via a client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
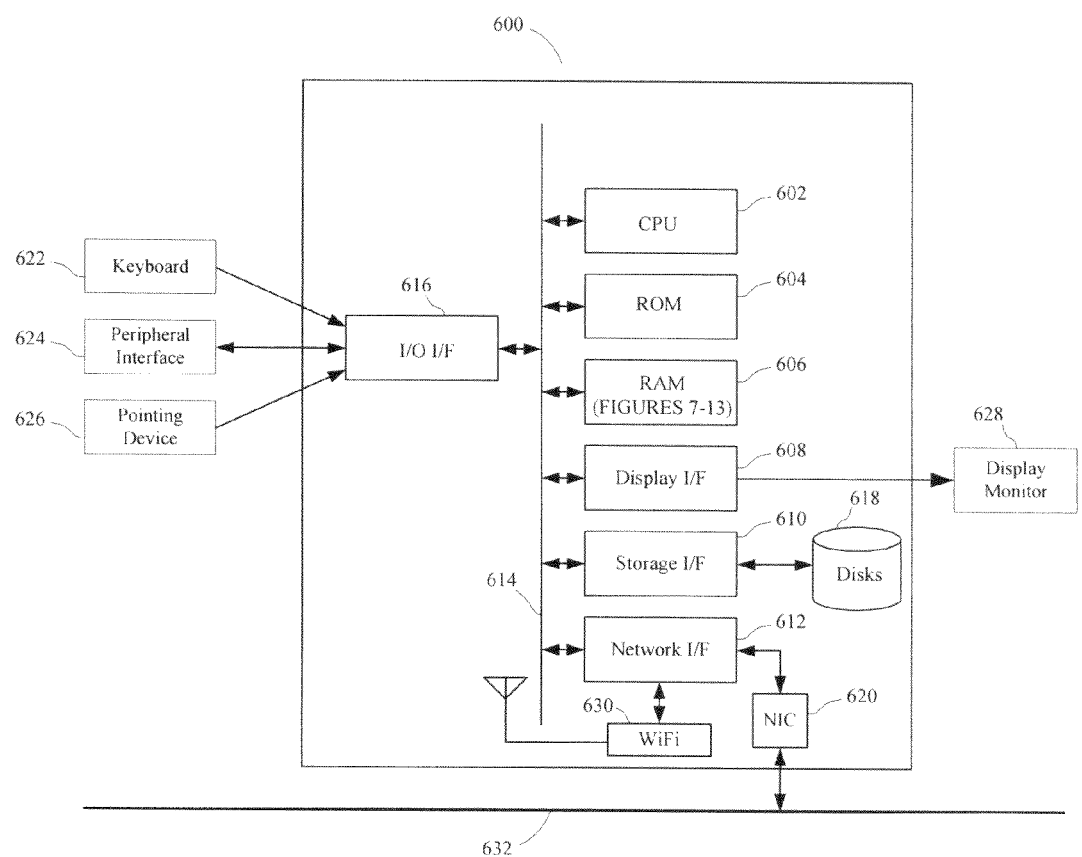
FIG. 6 is a diagram illustrating an administrative workstation for use in the system for color printer calibration employing measurement success feedback according to one embodiment of the subject application.

Turning now to FIG. 6, illustrated is a hardware diagram of a suitable workstation 600, shown as the user device 122, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
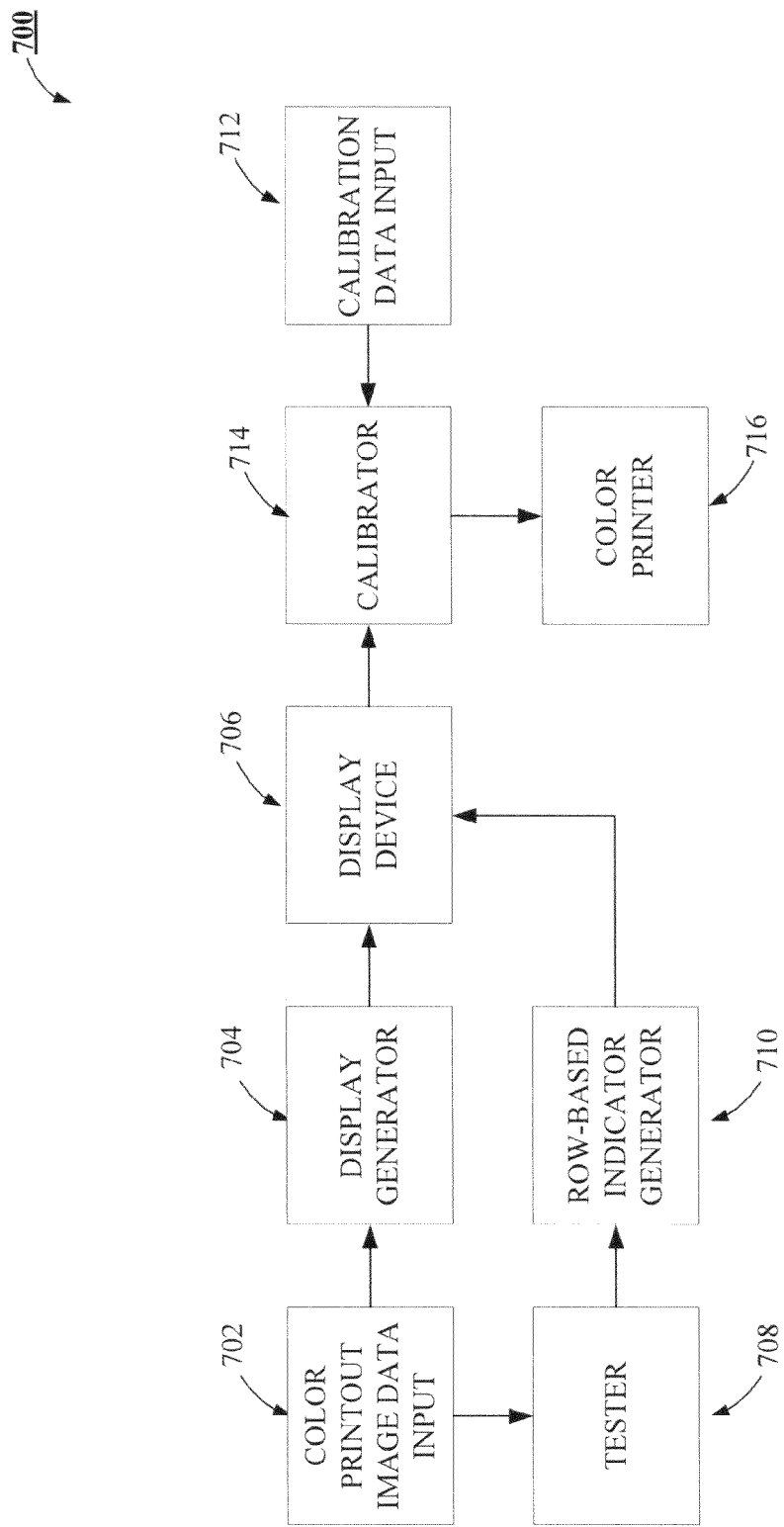
FIG. 7 is a block diagram illustrating the system for color printer calibration employing measurement success feedback according to one embodiment of the subject application.

Turning now to FIG. 7, illustrated is a block diagram of a system 700 for color printer calibration employing measurement success feedback in accordance with one embodiment of the subject application. The system 700 includes a color printout image data input 702 configured to receive color input data that corresponding to a color printout from a color measurement device. Preferably, the color input data received includes M×N discrete color areas representing M rows and N columns on the printout, with M and N being integers greater than 2. The system 700 also incorporates a display generator 704 configured to generate a display on an associated display device 706 corresponding to a color image of the printout. Preferably, the color image comprises each of the color areas arranged in M rows and N columns.

The system 700 further includes a tester 708 operable for testing the color input data so as to determine whether successful measurement of colors corresponding to the color areas has occurred. Communicatively coupled to the tester 708 is a row-based indicator generator 710 configured to generate an indicator on the display device 706 corresponding to a successful measurement of color areas within a corresponding row. The system 700 also includes a calibration data input operable to receive calibration data corresponding to a comparison of the color printout to the display of the display device 706. A calibrator 714 is also included in the system 700 so as to calibrate a color printer 716 in accordance with the received calibration data.

Figure 8:
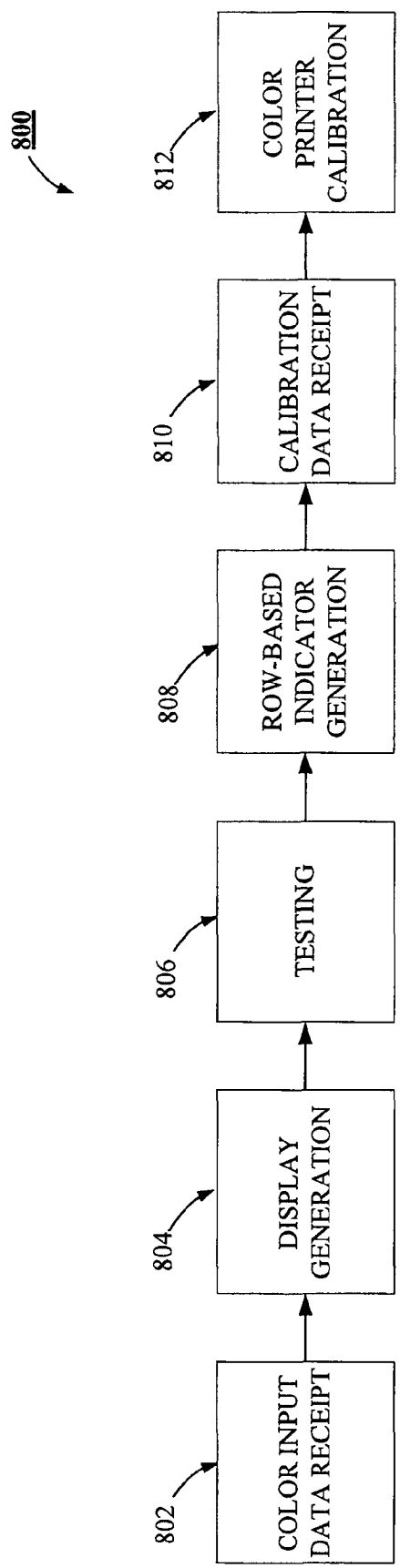
FIG. 8 is a functional diagram illustrating the system for color printer calibration employing measurement success feedback according to one embodiment of the subject application.

Referring now to FIG. 8, there is shown a functional diagram illustrating the system 800 for color printer calibration employing measurement success feedback in accordance with one embodiment of the subject application. Color input data receipt 802 first occurs of color input data corresponding to a color printout from an associated color measurement device. In accordance with one embodiment of the subject application, the color input data received via 802 includes M×N discrete color areas that correspond to M rows and N columns on an associated printout, with M and N representing integers greater than 2. Next display generation 804 is performed on an associated display of a color image comprised of each of the color areas arranged in M rows and N columns. Testing 806 is then performed on the color input data to determine successful measurement of colors corresponding to the color areas.

Row-based indicator generation 808 is then performed on the display representing a successful measurement of color areas within a corresponding row. Calibration data receipt 810 then occurs of calibration data corresponding to a comparison of the color printout to the display. Thereafter, color printer calibration 812 is performed in accordance with the calibration data received at 810.

Figure 9:
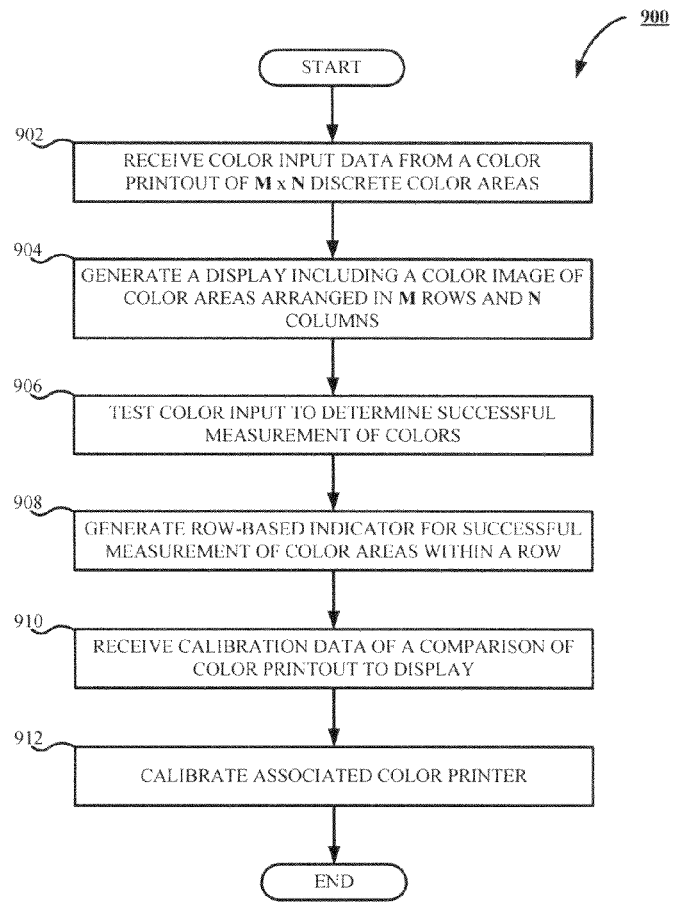
FIG. 9 is a flowchart illustrating a method for color printer calibration employing measurement success feedback according to one embodiment of the subject application.
Figure 11:
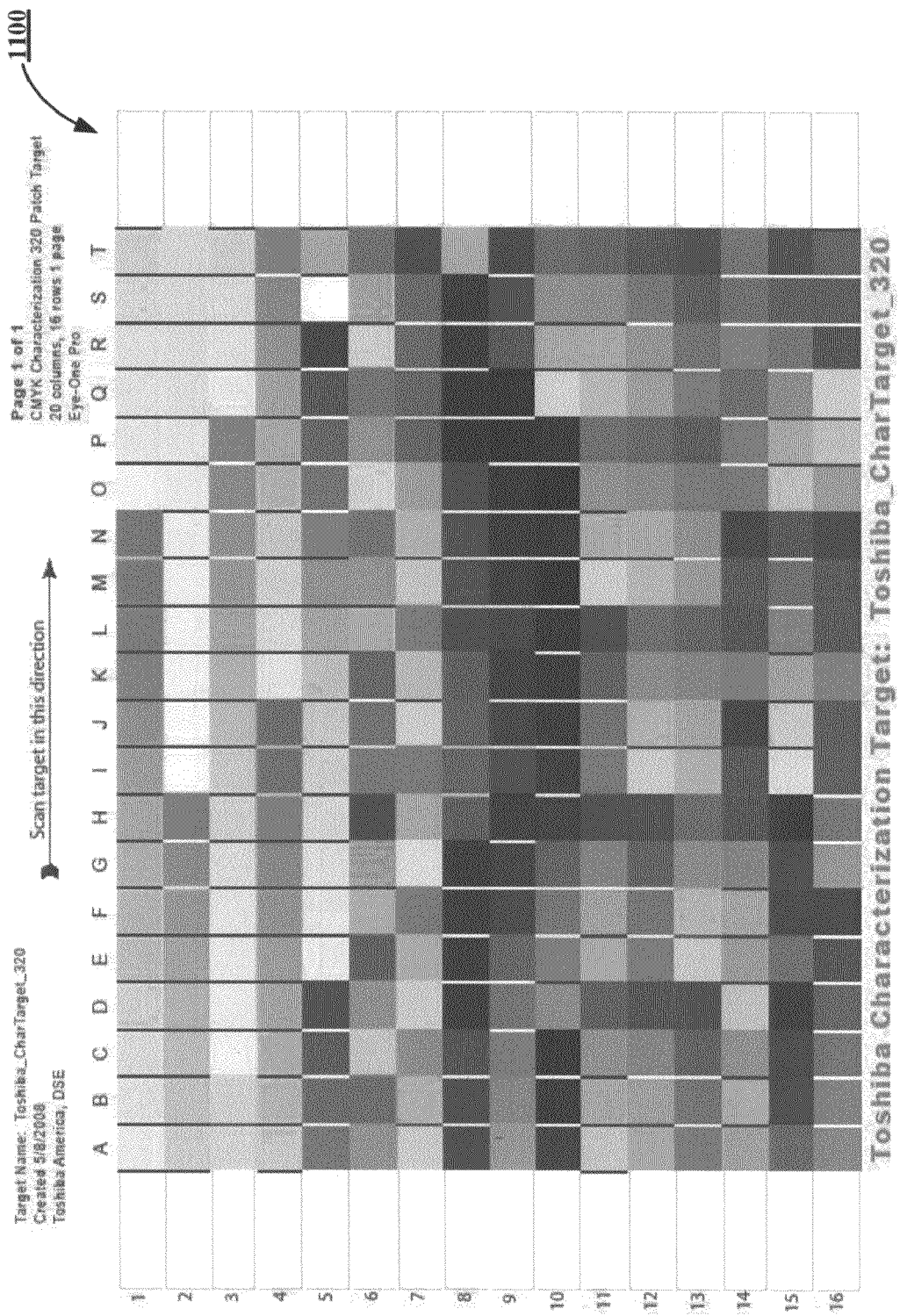
FIG. 11 is an example illustration of a color printout for use in the system and method for color printer calibration employing measurement success feedback according to one embodiment of the subject application.
Figure 12:
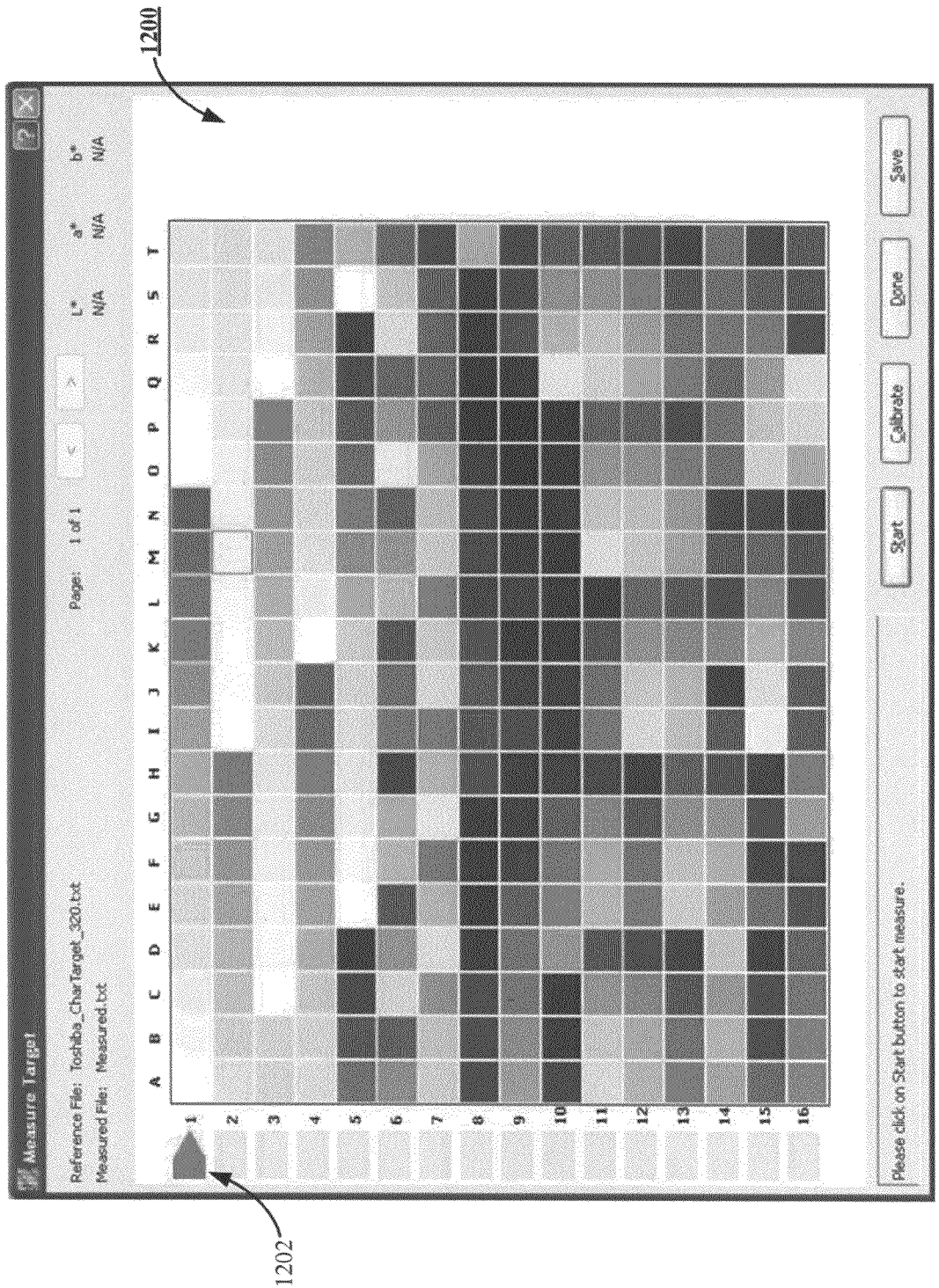
FIG. 12 is an example illustration of a first screen of color input data corresponding to the color printout for use in the system and method for color printer calibration employing measurement success feedback according to one embodiment of the subject application.
Figure 13:
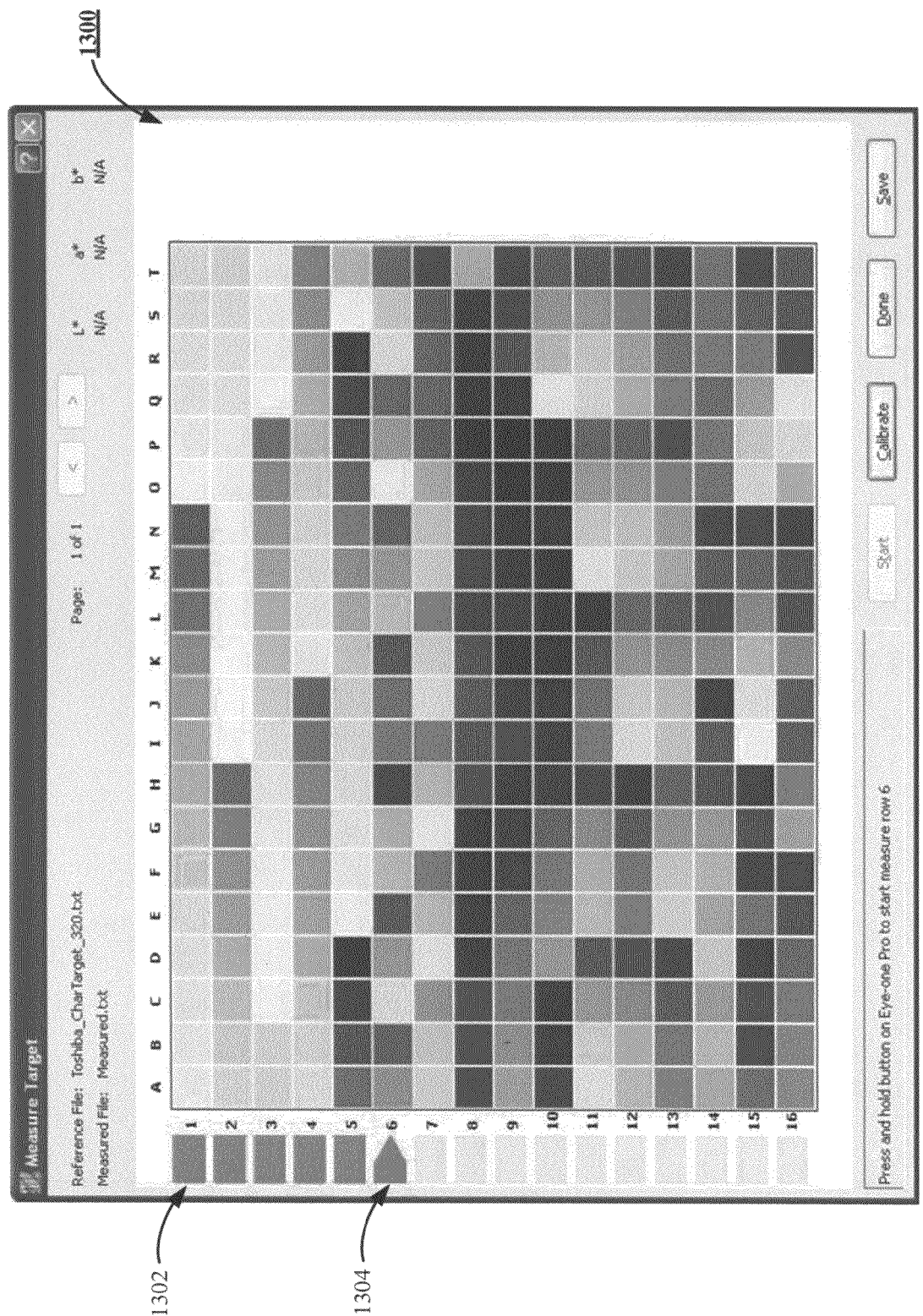
FIG. 13 is an example illustration of a second screen of color input data corresponding to the color printout for use in the system and method for color printer calibration employing measurement success feedback according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10, as well as the example illustrations of FIG. 11, FIG. 12, and FIG. 13. Turning now to FIG. 9, there is shown a flowchart 900 illustrating a method for color printer calibration employing measurement success feedback in accordance with one embodiment of the subject application. Beginning at step 902, color input data is received corresponding to a color printout 126 from an associated color measurement device 128. In accordance with one embodiment of the subject application, the color input data received from the color measurement device 128 includes M×N discrete color areas representing M rows and N columns on the color printout 126, with M and N being integers greater than 2. FIG. 11 illustrates a suitable color printout 1100 for use in accordance with one example embodiment of the subject application.

At step 904, a display is generated on an associated display device, e.g. the user device 122, the display 116 of the kiosk 114, or the user interface 106 of the document processing device 104. According to a preferred embodiment of the subject application, the display includes a color image consisting of the color areas of the input data arranged in M rows and N columns. FIG. 12 illustrates a suitable screen display 1200 of color areas arranged in M rows and N columns in accordance with one example embodiment of the subject application. FIG. 12 is discussed in greater detail below.

Color input data is then tested at step 908 to determine successful measurement of colors corresponding to the color areas. A row-based indicator is then generated on the display at step 910, which indicates a successful measurement of color areas within a corresponding row. FIG. 13 illustrates a screen display 1300 that includes an example indicator 1302 indicative of a successful measurement of colors in the color areas. Discussion of FIG. 13 is continued below with respect to the methodology of FIG. 11.

Calibration data is then received at step 910 corresponding to a comparison of the color printout 126 to the display of the input color data. Those skilled in the art will appreciate that such a comparison is capable of being performed by an associated user, by software, hardware, or a suitable combination thereof resulting in such calibration data. Thereafter, at step 912 a color printer, e.g. the document processing device 104, is calibrated in accordance with the received calibration data.

Figure 10:
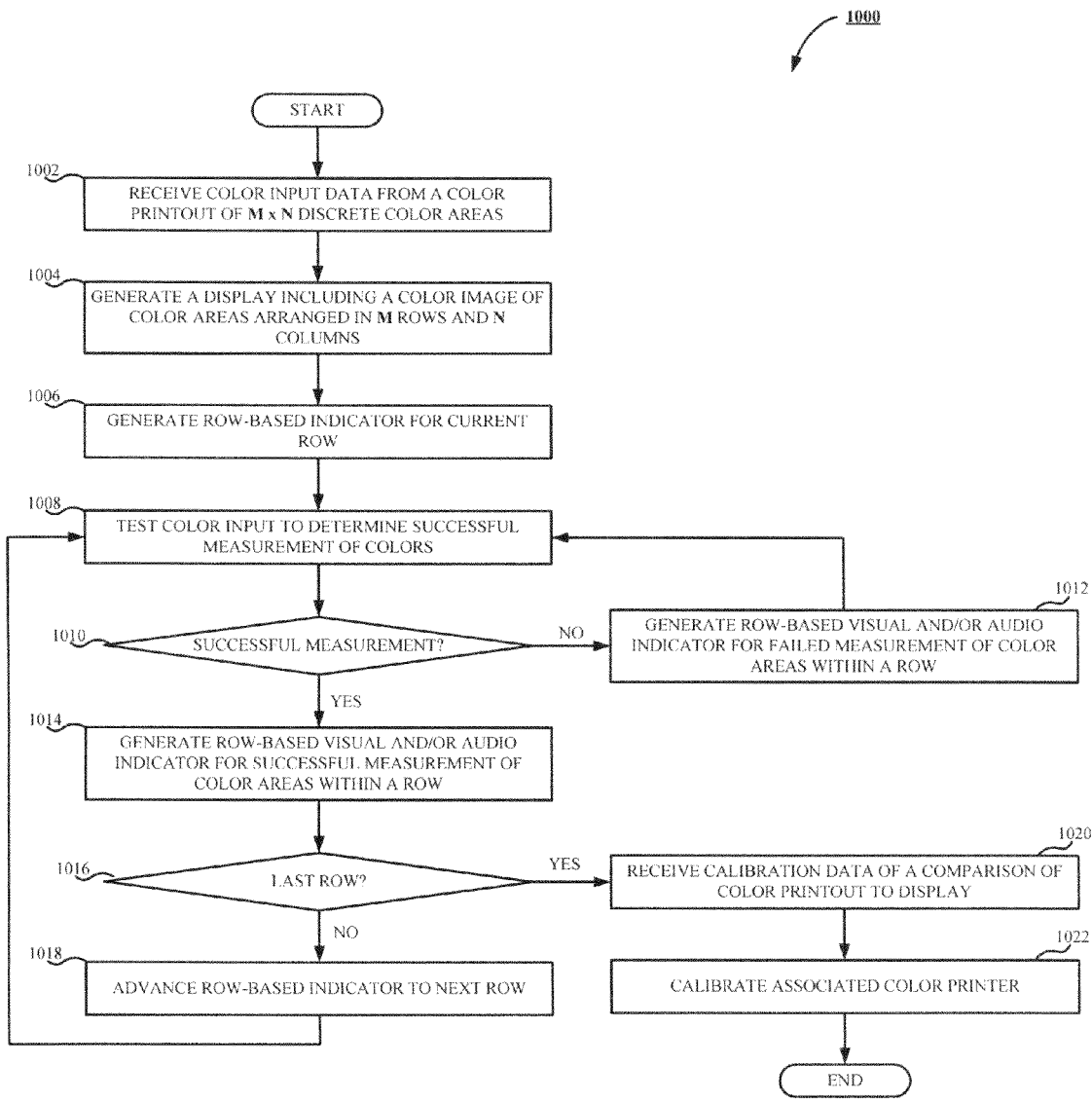
FIG. 10 is a flowchart illustrating a method for color printer calibration employing measurement success feedback according to one embodiment of the subject application.

Referring now to FIG. 10, there is shown a flowchart 1000 illustrating a method for color printer calibration employing measurement success feedback in accordance with one embodiment of the subject application. The methodology of FIG. 10 begins at step 1002, whereupon the color measurement device 128 generates color input data from the color printout 126 of M×N discrete color areas in a subtractive primary color space. In accordance with one embodiment of the subject application, the subtractive color space is cyan, magenta, yellow, (CMY) color space. The skilled artisan will appreciate that other suitable subtractive color spaces are also capable of being employed in accordance with the subject application. In one such embodiment, each color area of the printout 126 is comprised of a rectangle having a preselected number of pixels, e.g. each rectangle having a length and width in the range of 20 pixels to 30 pixels. In the preceding example embodiment, each rectangle is preferably separated from one another by a range of 1 pixel to 2 pixels.

In accordance with one example embodiment, the printout 126 comprises one page, illustrated as page 1100 of FIG. 11. The skilled artisan will appreciate that the use of a single page is for example purposes only, and depending upon the type of color printer, e.g. document processing device 104, to be calibrated, is capable of being adjusted so as to reflect the output capabilities of the printer. That is, when a color printer is capable of outputting more colors than illustrated in FIG. 11, more pages are included with the color printout 126, and color input data generated by the color measurement device 128 reflects the greater number of pages.

Operations then proceed to step 1004, whereupon a screen display is generated on an associated display, e.g. the user interface 106, the display 116, or the user device 122, representing the color printout 126 from the received color input data. Preferably, the screen includes a color image of the color areas of the printout 126 arranged in M rows and N columns. In accordance with one embodiment of the subject application illustrates the M rows and N columns of rectangular color areas, each area in the range of 20 pixels to 30 pixels in length and width, while separation of the rectangular areas is 1 pixel to 2 pixels. FIG. 12 illustrates a first screen 1200 depicting the page 1100 of the color printout 126 illustrated in FIG. 11. A row-based indicator is then generated for the current row on the display is then generated at step 1006. FIG. 12 illustrates a suitable indicator 1202 in the form of a visual arrow designating the current row of the page 1200. It will be appreciated by those skilled in the art that such indicator 1202 is for example purposes only, and the color, shape, orientation, position, and the like, are all capable of modification without departing from the scope of the subject application.

At step 1008, color input data is tested to determine successful measurement of colors in the row being measured. The skilled artisan will appreciate that such testing includes, for example and without limitation, first comparing a number of scanned sample patches with a number of reference sample patches. In such a technique, the number of scanned sample patches represents the number of patches reported from the color measurement device and the number of reference sample patches represents the number of sample patches from the input reference file. If the number of scanned sample patches differs from the number of reference sample patches, an error occurs and re-measurement is required. When the numbers match, the final step compares the color difference to distinguish whether or not the correct row of color patches has been measured. When the correct colors are identified, a successful measurement is determined.

A determination is then made at step 1010 whether the color measurement of the color areas in the row is successful. Upon a negative determination at step 1010, flow proceeds to step 1012, whereupon a row-based visual and/or audio indicator is generated on the display corresponding to a failed measurement of the color areas within the row. It will be appreciated by those skilled in the art that the subject application is capable of generating indicia for the row inclusive of a different color, different shape, and/or an audio tone that would indicate to a user that a failure has occurred. In accordance with one embodiment of the subject application, suitable audio tones include, for example and without limitation A2 and C2 (110 Hz and 65 Hz). Other tones, sounds, or indicia are also capable of being generated so as to provide audio and/or visual queues to the user of the occurrence of a failed measurement test. Following such generation at step 1012, flow returns to step 1008, whereupon the row-based indicator is generated on the same row and measurement repeats.

Following a successful measurement, as determined at step 1010, operations proceed to step 1014, whereupon a row-based visual and/or audio indicator for successful measurement of color areas within a row is generated. In accordance with one embodiment of the subject application, such an indicator includes, for example and without limitation, a change in row-indicator color, shape, orientation, position, or the like, as well as the generation of a suitable tone, e.g. G6 and A6 (1568 Hz and 1760 Hz). Other indicia are equally capable of being used in accordance with the subject application. FIG. 13 illustrates a testing measurement screen 1300 depicting suitable successful indicia 1302 for completed testing, as well as a row indicator 1304 corresponding to the current row being measured.

After generation of successful row measurement, flow proceeds to step 1016. At step 1016 a determination is made whether or not the row just measured is the last row of the printout 126. Upon a negative determination at step 1016, flow proceeds to step 1018 whereupon the row-based indicator 1304 is advanced next row to be measured, e.g. from row 6 to row 7. Thereafter, operations return to step 1008 for measurement of the current row via testing of the color input as set forth above. Following a positive determination at step 1016, operations progress to step 1020.

At step 1020, calibration data is then received corresponding to a comparison performed between the color printout 126 with the display. It will be appreciated by those skilled in the art that such a comparison is capable of being performed via user interaction, via automated color processing by the controller 108 or user device 104 using the color input data, or the like. The associated color printer, e.g. the document processing device 104, is then calibrated in accordance with the received calibration data at step 1022.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A color printer calibrator employing measurement success feedback comprising:

an input operable to receive color input data corresponding to a color printout from an associated color measurement device, the color input data including M×N discrete color areas corresponding to M rows and N columns on an associated printout, wherein M and N are integers greater than 2;

a display generator operable to generate a display on an associated display device, the display including a color image comprised of each of the color areas arranged in M rows and N columns;

a tester operable to test color input data to determine successful measurement of colors corresponding to the color areas;

a row-based indicator generator operable to generate an indicator corresponding to a successful measurement of color areas within a corresponding row, the indicator comprised of an audible indicium corresponding to each of the M rows;

an input for calibration data corresponding to a comparison of the color printout to the display; and a calibrator operable to calibrate an associated color printer in accordance with received calibration data.

2. The calibrator of claim 1 wherein the indicator is further comprised of a visual indicium on the display corresponding to an associated row.

3. The calibrator of claim 2 wherein the visual indicium includes at least one of a shape variation and a color variation corresponding to a relative success of measurement of color indicators in each row.

4. The calibrator of claim 3 wherein the indicator is further comprised of a visual indicium on the display corresponding to an associated column.

5. The calibrator of claim 1 wherein the audible indicium includes a tone level corresponding to a relative success of measurement of color indicators in each row.

6. A method of color printer calibration employing measurement success feedback comprising the steps of:

receiving color input data corresponding to a color printout from an associated color measurement device, the color input data including M×N discrete color areas corresponding to M rows and N columns on an associated printout, wherein M and N are integers greater than 2;

generating a display on an associated display device, the display including a color image comprised of each of the color areas arranged in M rows and N columns;

testing color input data to determine successful measurement of colors corresponding to the color areas;

generating a row-based indicator corresponding to a successful measurement of color areas within a corresponding row, the indicator comprised of an audible indicium corresponding to each of the M rows;

receiving calibration data corresponding to a comparison of the color printout to the display; and calibrating an associated color printer in accordance with received calibration data.

7. The method of claim 6 wherein the indicator is further comprised of a visual indicium on the display corresponding to an associated row.

8. The method of claim 7 wherein the visual indicium includes at least one of a shape variation and a color variation corresponding to a relative success of measurement of color indicators in each row.

9. The method of claim 8 wherein the indicator is further comprised of a visual indicium on the display corresponding to an associated column.

10. The method of claim 6 wherein the audible indicium includes a tone level corresponding to a relative success of measurement of color indicators in each row.

11. A system of color printer calibration employing measurement success feedback comprising:

means adapted for receiving color input data corresponding to a color printout from an associated color measurement device, the color input data including M×N discrete color areas corresponding to M rows and N columns on an associated printout, wherein M and N are integers greater than 2;

means adapted for generating a display on an associated display device, the display including a color image comprised of each of the color areas arranged in M rows and N columns;

means adapted for testing color input data to determine successful measurement of colors corresponding to the color areas;

means adapted for generating a row-based indicator corresponding to a successful measurement of color areas within a corresponding row, the indicator comprised of an audible indicium corresponding to each of the M rows;

means adapted for receiving calibration data corresponding to a comparison of the color printout to the display; and means adapted for calibrating an associated color printer in accordance with received calibration data.

12. The system of claim 11 wherein the indicator is further comprised of a visual indicium on the display corresponding to an associated row.

13. The system of claim 12 wherein the visual indicium includes at least one of a shape variation and a color variation corresponding to a relative success of measurement of color indicators in each row.

14. The system of claim 13 wherein the indicator is further comprised of a visual indicium on the display corresponding to an associated column.

15. The system of claim 11 wherein the audible indicium includes a tone level corresponding to a relative success of measurement of color indicators in each row.

* * * * *